US008275888B2

(12) United States Patent
Branigan et al.

(10) Patent No.: US 8,275,888 B2
(45) Date of Patent: Sep. 25, 2012

(54) INDEXING HETEROGENEOUS RESOURCES

(75) Inventors: James P. Branigan, Creedmoor, NC (US); David P. Charboneau, Durham, NC (US); Simon K. Johnston, Siler City, NC (US); Martin P. Nally, Laguna Beach, CA (US); Lawrence S. Rich, Cary, NC (US); Edison L. Ting, San Jose, CA (US); Robbert Van der Linden, Scotts Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 12/625,894

(22) Filed: Nov. 25, 2009

(65) Prior Publication Data

US 2011/0125904 A1 May 26, 2011

(51) Int. Cl.
*G06F 15/173* (2006.01)
(52) U.S. Cl. ........ 709/226; 709/203; 709/217; 709/219; 707/706; 707/769; 707/688; 707/740
(58) Field of Classification Search .................. 709/203, 709/217, 226, 219; 707/1–10, 100–102, 707/706, 769, 688, 740
See application file for complete search history.

(56) References Cited

U.S. PATENT DOCUMENTS

2003/0177124 A1* 9/2003 Sauri ............................... 707/10
2009/0024650 A1* 1/2009 Kamani et al. ................ 707/102

OTHER PUBLICATIONS

Dusseault, L., "HTTP Extensions for Web Distributed Authoring and Versioning (WebDAV)", www.ietf.org/rfc/rfc4918.txt (Obtained from the Internet: May 26, 2009) Jun. 2007, 162 pages.
Goland, Y. et al., "HTTP Extensions for Distributed Authoring—WEBDAV", www.ietf.org/rfc/rfc2518.txt (Obtained from the Internet: May 26, 2009) Feb. 1999, 120 pages.
W3, "Resource Description Framework (RDF)", www.w3.org/RDF/ (Obtained from the Internet: May 26, 2009) (Last Date Modified: Apr. 30, 2009), 10 pages.
W3, "SPARQL Query Language for RDF", www.w3.org/TR/rdf-sparql-query/ (Obtained from the Internet: May 26, 2009) Jan. 15, 2008, 111 pages.
W3, "XQuery 1.0: An XML Query Language", http://www.w3.org/TR/xquery/ (Obtained from the Internet: May 22, 2009) Jan. 23, 2007, 207 pages.
Wikipedia, "Web 2.0", http://en.wikipedia.org/wiki/Web_2.0 (Obtained from the Internet: May 22, 2009) (Last Date Modified: May 22, 2009), 5 pages.

* cited by examiner

*Primary Examiner* — Wing Chan
*Assistant Examiner* — Hitesh Patel
(74) *Attorney, Agent, or Firm* — DeLizio Gilliam, PLLC (57) ABSTRACT

Resources are typically stored in homogenous data structures by shredding resource data into database tables destroying a native format of the resources. Typical approaches to indexing the resources rely on users indicating properties that should be indexed, using full text searches to create resource index documents, and other such labor and computation intensive processes. Functionality can be implemented to dynamically generate the resource index documents based on resource properties with minimal user input. The resource index documents can be in a common format to facilitate access to resources stored in heterogeneous native resource formats.

18 Claims, 5 Drawing Sheets

INDEXING HETEROGENEOUS RESOURCES

BACKGROUND

Embodiments of the inventive subject matter generally relate to the field of data storage and retrieval and, more particularly, to techniques for indexing heterogeneous resources.

Storage and retrieval of resources typically involves shredding resource data into database tables and querying the resource data from the database tables. Indexing the resources for faster retrieval entails creating index documents from user specified properties and/or content retrieved as a result of full text searches.

SUMMARY

Embodiments include a method comprising determining a resource category for a resource based, at least in part, on metadata of the resource. A resource index schema for the resource is identified based, at least in part, on the resource index schema indicating a resource property of the resource. A property value for the resource property is determined from the metadata. An index document that has a format independent of a format of the resource is created. The index document indicates the resource property and the property value and references the resource in a resource store of heterogeneous native format resources. The index document is stored in an index store that comprises a plurality of index documents, where the index document and the plurality of index documents have common formatting.

Another embodiment includes a method comprising determining a query parameter specifying a property value of a resource property of a resource based, at least in part, on a query to retrieve the resource from a resource store of heterogeneous native format resources. An index store that comprises a plurality of index documents is searched to identify an index document that indicates the resource property and the property value specified in the query parameter. The plurality of index documents in the index store has common formatting. The index document that indicates the resource property and the property value specified in the query parameter and that references the resource in the resource store is identified. The resource is retrieved from the resource store based on identifying the index document that indicates the resource property and the property value specified in the query parameter and that references the resource in the resource store.

Another embodiment includes a computer program product for indexing heterogeneous resources, where the computer program product comprises a computer usable medium comprising computer usable program code. The computer usable program code is configured to determine a resource category for a resource based, at least in part, on metadata of the resource. The computer usable program code is configured to identify a resource index schema for the resource based, at least in part, on the resource index schema indicating a resource property of the resource. The computer usable program code is also configured to determine a property value for the resource property from the metadata. The computer usable program code is configured to create an index document that has a format independent of a format of the resource. The index document indicates the resource property and the property value and references the resource in a resource store of heterogeneous native format resources. The computer usable program code is further configured to store the index document in an index store that comprises a plurality of index documents. The index document and the plurality of index documents have common formatting.

Another embodiment includes an apparatus comprising a processor, a network interface coupled with the processor, a resource store for storing heterogeneous native format resources, an index store comprising a plurality of index documents with common formatting and a resource-indexing unit. The resource-indexing unit is operable to determine a resource category for a resource based, at least in part, on metadata of the resource. The resource-indexing unit is also operable to identify a resource index schema for the resource based, at least in part, on the resource index schema indicating a resource property of the resource. The resource-indexing unit is operable to determine a property value for the resource property from the metadata. The resource-indexing unit is operable to create an index document that has a format independent of a format of the resource. The index document indicates the resource property and the property value, and references the resource in the resource store. The resource-indexing unit is further configured to store the index document in the index store, where the index document and the plurality of index documents have common formatting.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to generating index documents as Resource Description Framework (RDF) documents, the index documents can be generated in other formats (e.g., Extensible Markup Language (XML) documents). In other instances, well-known instruction instances, protocols, structures, and techniques have not been shown in detail in order not to obfuscate the description.

Storage and retrieval of resources typically focuses on creation of homogenous data structures that can be mapped to relational database middleware by shredding resource data into database tables. This approach fails in a heterogeneous resource environment where the resources need to be stored and retrieved in their native formats because shredding the resource data results in a difference between the resource's input and output formats. Typical approaches to indexing require user input (e.g., the user may be required to input properties that should be indexed) and may be computationally intensive (e.g., using full text searches to generate indexes).

A resource-indexing unit that constructs resource index documents in a common format allows clients to perform queries to access resources stored in heterogeneous native resource formats. The resource-indexing unit can construct index documents indicating properties of the resources and relationships between the resources in order to support the queries to access the resources. Storing resources in their native formats and using resource format independent index documents to retrieve the resources can preclude the need for modifying the native resource format. This can be particularly helpful in the development of healthcare systems, which have to deal with patient records, medical images, and other digital data and provide query and data mining functions across all of a patient's medical records. Moreover, the resource-indexing unit can dynamically generate resource index documents based on resource properties specified in the resource metadata thus minimizing user input and reducing the computational intensity.

Figure 1:
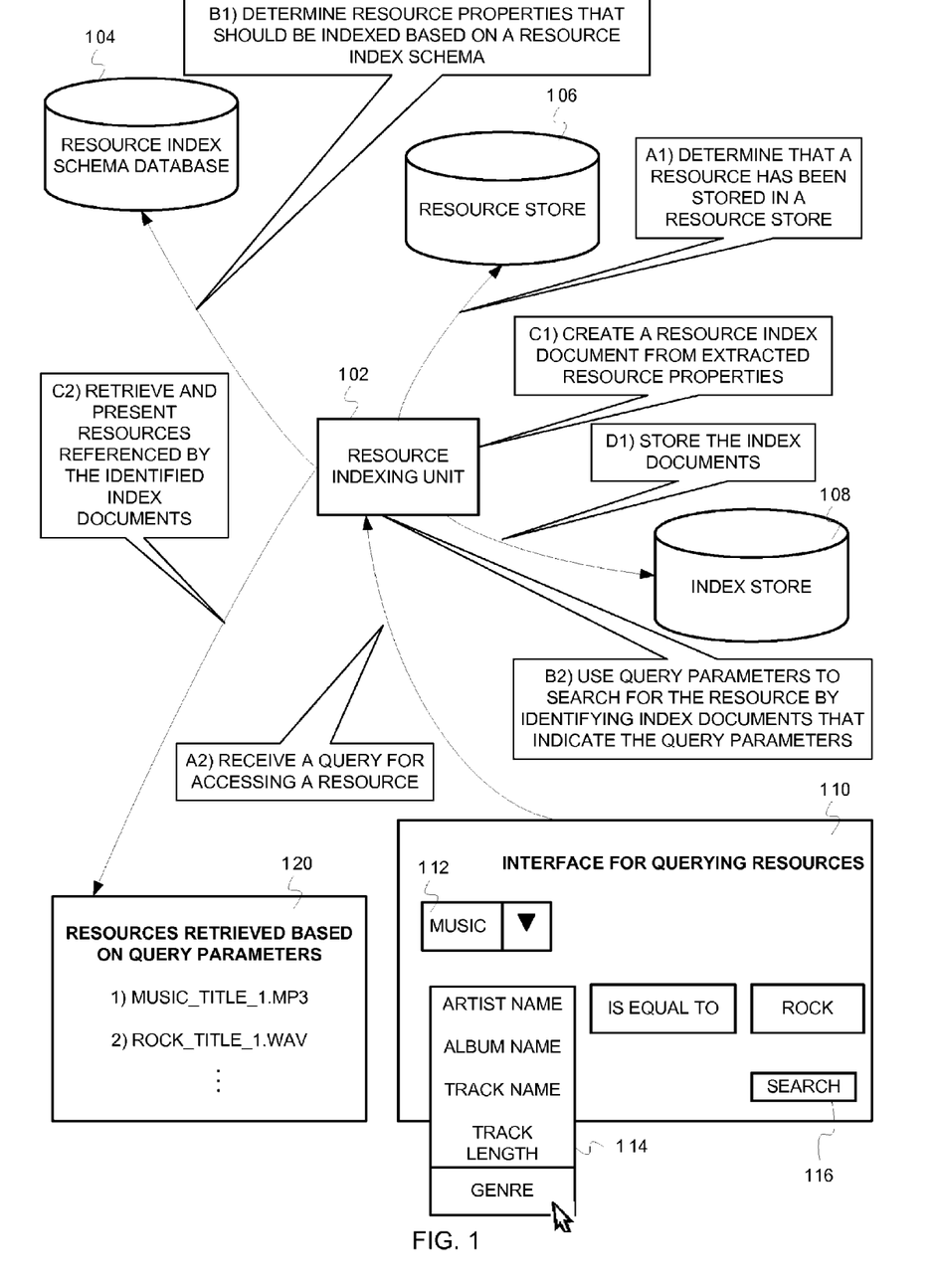
FIG. 1 is a conceptual diagram for indexing and storing resources in heterogeneous resource formats.

FIG. 1 is a conceptual diagram for indexing and storing resources in heterogeneous resource formats. In FIG. 1, a resource-indexing unit 102 is coupled with a resource store 106, a resource index schema database 104, and an index store 108. Resources are stored, in their native format, in the resource store 106. All operations (e.g., create, update, delete, retrieve, etc.) on the resources take place against the resource store 106. Queries for operating on the resources are directed to the index store 108. The index store 108 comprises a set of properties about the resources. The resource index schema database 104 comprises a set of schemata that define the set of properties, about the resources that should be indexed. The resource-indexing unit 102 constructs resource index documents based on the set of resource properties identified by at least one resource index schema. The resource index documents allow clients to query for the resources stored in the heterogeneous resource formats.

At stage A1, the resource-indexing unit 102 determines that a resource has been stored in the resource store 106. In some implementations, the resource-indexing unit 102 can query the resource store 106 at regular intervals of time (e.g., every hour) to identify resources that have been stored during the time intervals. In other implementations, the resource store 106 may invoke the resource-indexing unit 102 or transmit a notification to the resource-indexing unit 102 indicating that a user has stored the resource on the resource store 106. The resources in the resource store 106 are stored in their native formats. For example, the resource store 106 may store documents, images, structured XML resources, resources in legacy or proprietary formats, etc.

At stage B1, the resource-indexing unit 102 determines resource properties that should be indexed based on at least one resource index schema. The resource-indexing unit 102 can identify a category to which the resource belongs ("resource category"). For example, the resource-indexing unit 102 may determine, based on a filename extension, that the resource is a text file. As another example, the resource-indexing unit 102 may examine the resource's metadata and determine that the resource is an audio file. The resource index schema database 104 can comprise a resource index schema specific to each resource category. In some implementations, the user or client application may upload a resource index schema as a plug-in or other hardware/software component. The resource-indexing unit 102 can then access the resource index schema database 104 and determine whether the resource index schema for the identified resource category exists. For example, the resource-indexing unit 102 may query the resource index schema database 104 and retrieve a resource index schema for HyperText Markup Language (HTML) files indicating which properties of the HTML files should be indexed. The resource index schema is a declarative specification of the resource properties that should be indexed. The resource index schema may specify a subset of the resource properties. The resource-indexing unit 102 reads the resource properties (e.g., from the resource metadata) that should be indexed as indicated by the resource index schema.

At stage C1, the resource-indexing unit 102 creates an index document for the resource ("resource index document") from the resource properties. The resource-indexing unit 102 may create an RDF based resource index document describing the resource in the resource store 106. In some implementations, the resource-indexing unit 102 may create more than one index document for the resource. For example, to describe an album in a music database, the resource-indexing unit 102 can create an index document for the album comprising properties of the album (e.g., album name, release date, record label, etc.). The resource-indexing unit 102 may also create one index document for each of the tracks on the album. The index documents for the tracks can comprise properties such as track name, track length, writer, etc.

At stage D1, the resource-indexing unit 102 stores the resource index document in the index store 108. The index store 108 can have a fixed server-defined format so that clients can write queries efficiently and in a standard query format. In one implementation, RDF can be used to represent the resource properties that are indexed ("indexed resource properties"). The index store 108 may be an XML enabled database. Storing RDF resource index documents in the XML enabled index store 108 can allow both XML processors and RDF processors to efficiently access the index store 108 using XML based queries and RDF based queries respectively. In another implementation, the index store 108 may be an RDF store and queries in an RDF query language (e.g., SPARQL) may be directed to the index store 108. As another example, the index store 108 may be an XML store and queries in an XML query language (e.g. XQuery) may be directed to the index store 108.

Stages A2-C2 describe how the index documents in the index store 108 are used to identify and retrieve the resources in the resource store 106.

At stage A2, the resource-indexing unit 102 receives a query for accessing the resource. A client application on the user's computer system may present an interface 110 for querying the resource. The user may specify a resource category 112 to narrow the scope of the query. In FIG. 1, the user specifies, via the interface 110, that the resource belongs to the music category 112. On the interface 110, the client application presents various search criteria based on resource properties that correspond to the selected resource category 112. In FIG. 1, drop down menu 114 presents artist name, album name, track name, track length, genre as search criteria for querying the resource. In some implementations, the client application may keep track of the indexed resource properties, specified by the user while uploading the resource, and present the indexed resource properties as the search criteria. In another implementation, the client application may interface with the resource-indexing unit 102 and retrieve and present a list of search criteria (e.g., indexed properties for music resources, previously searched properties of the music resources, indexed/searched properties for all resource categories, etc.). In FIG. 1, the user indicates that music resources with "genre equal to rock" should be retrieved. The client application transmits the query to the resource-indexing unit 102 after the user clicks on a search button 116.

At stage B2, the resource-indexing unit 102 uses query parameters to search for the resource by identifying index documents that indicate the query parameters. The resource-indexing unit 102 can retrieve the query parameters from the query transmitted by the client application. The query parameters can indicate the resource category for the resource being queried. The query parameters can also indicate user-specified values for the search criteria. In FIG. 1, the query parameters are "resource category=music" and "genre is equal to rock". The resource-indexing unit 102 uses the query parameters, searches through the index documents in the index store 108, and identifies the index documents with indexed resource properties that match the query parameters. For example, the resource-indexing unit 102 can search through the indexed resource properties and identify the index documents such that the indexed resource property "genre" has an associated value of "rock". The resource-indexing unit 102 can identify a location of the resources referenced by the identified index documents.

At stage C2, the resource-indexing unit 102 retrieves the resources referenced by the identified index documents from the resource store 106 and presents the resources. The resource-indexing unit 102 may transmit the resources or links to locations of the resources for presentation on the client application. This is depicted by interface 120. The resources may be downloaded from the resource store 106 for presentation on the client in response to the user clicking on a link to one of the resources presented on the interface 120.

Figure 2:
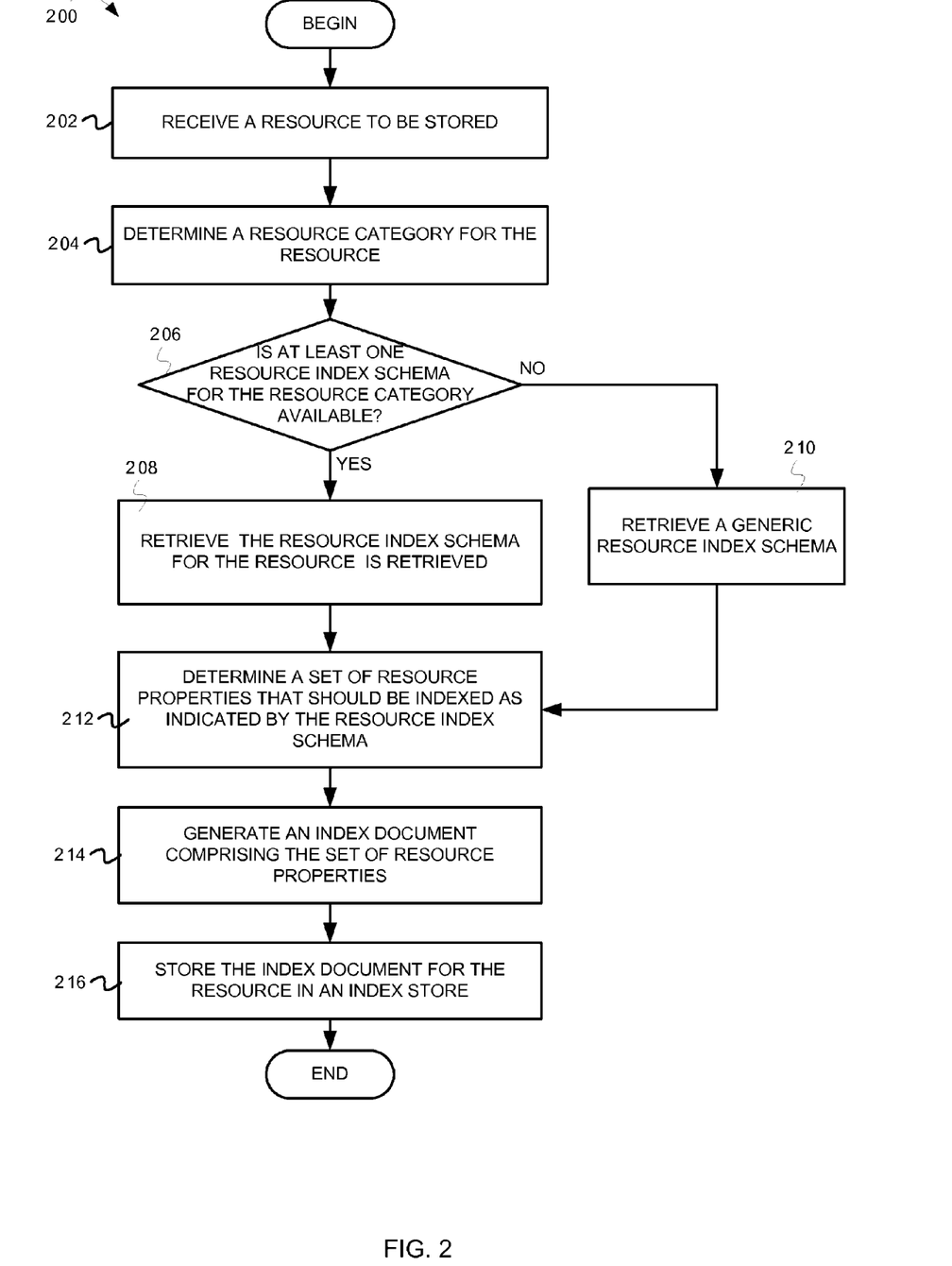
FIG. 2 is a flow diagram illustrating example operations for dynamically creating index documents for heterogeneous resources.

FIG. 2 is a flow diagram illustrating example operations for dynamically creating index documents for heterogeneous resources. Flow 200 begins at block 202.

A resource to be stored in a resource store is received (block 202). A notification may be received in response to a user uploading the resource (e.g., an audio file, a text file, a spreadsheet, an HTML document, an XML document, etc.) to the resource store. For example, a process running on the resource store may generate a notification every time a resource is stored on the resource store. In another implementation, the resource store may be queried at regular intervals of time and a list of resources (e.g., resource names, location on the resource store, etc.) that were stored during the interval of time may be generated. The flow continues at block 204.

A resource category for the resource is determined (block 204). The resource category may be determined based on identifying a filename extension of the resource. For example, a resource with filename extension ".doc" may be categorized as a text file. In some implementations, the resource category may also be determined based on resource metadata. In another implementation, a user may indicate the resource category when the user stores the resource. For example, the user may select the resource category (e.g., music, image, etc.) or a resource file name extension via an interface for uploading the resource. In some implementations, a client application may identify the resource category and indicate the resource category in the resource metadata. The flow continues at block 206.

It is determined whether at least one resource index schema for the resource category is available (block 206). A resource index schema database 104 can comprise a resource index schema specific to each resource category. In some implementations, resource index schema specific to the resource may also be uploaded. For example, the user may upload an image file and also upload a resource index schema specific to the image file. Resource index schemata indicating resource properties that should be indexed in addition to those specified by existing resource index schemata may also be uploaded. The resource index schema specifies resource properties that should be indexed. The resource index schema may be an XML file with declarative statements indicating a set of resource properties that should be indexed for easy identification and retrieval of the resource. If it is determined that at least one resource index schema for the resource category is available, the flow continues at block 208. Otherwise, the flow continues at block 210.

A generic resource index schema is retrieved (block 210). The generic resource index schema may be retrieved when the resource index schema for the resource category or the resource index schema specific to the resource is not available. The generic resource index schema may also be retrieved if resource metadata or resource properties cannot be identified or if the resource category cannot be identified. The generic resource index schema indicates that resource properties associated with storing the resource should be indexed. For example, resource properties such as a date and time when the resource was stored, a name of the resource, information identifying the user (e.g., user name, user identification number, etc.) who stored the resource, device identification information (e.g., a MAC address of a computer system used to store the resource, an IP address of a website through which the resource was uploaded, etc.), etc. The flow continues at block 212.

The resource index schema for the resource is retrieved (block 208). As described earlier, the resource index schema specifies the set of resource properties that should be indexed. The code snippet below is an example resource index schema for an audio resource. As depicted in the code snippet, the resource index schema indicates that for the audio resource, an index document comprising resource properties such as album name, album artist, and genre should be generated. The resource index schema also indicates that separate index documents comprising track name and track number for be created for each audio track in the album. The flow continues at block 212.

```
<indexSpecification xmlns="" namespace="http://example.com/xmlns/music">
<index element="/album/name"/>
<index element="/album/artist" objectType="uri"/>
<index element="/album/genre"/>
<index secondaryElement="/album/track/@id" object="./name"/>
<index secondaryElement="/album/track/@id" object="./trackNumber" objectType="int"/>
</indexSpecification>
```

The set of resource properties that should be indexed ("indexed resource properties") as indicated by the resource index schema are determined (block 212). The set of resource properties may be determined from the resource metadata. An example XML file comprising metadata for an audio resource is depicted below.

```
<album xmlns="http://example.com/xmlns/music">
<name> Keep the Faith </name>
<releasedYear>1992</releasedYear>
<artist>/jazz/resources/musicdb/artists/artist-1</artist>
. . .
<genre>Rock</genre>
<track id="track-01">
<name>I believe</name>
<trackNumber>1</trackNumber>
```

```
        <duration>10:01</duration>
        <writer>/jazz/resources/musicdb/artists/artist-101</writer>
        <writer>/jazz/resources/musicdb/artists/artist-102</writer>
    </track>
</album>
```

From the above example, the resource metadata specifies properties of the audio resource such as album name, year of release, artist, track information (e.g., track number, write, duration, etc.) etc. Based on the resource index schema retrieved for the audio resource, only a subset of the resource properties are to be indexed. Thus, for this example, only the album name, album artist, and genre may be retrieved from the resource metadata. A track name and track number are also retrieved for every track in the album. The set of resource properties to be indexed may be determined based on commonly used search criteria. The flow continues at block 214.

An index document, comprising the set of resource properties, is generated for the resource (block 216). The index document may be an RDF document. Based on the resource index schema, one or more index documents may be generated for the resource. For the music resource example, multiple index documents are generated for the audio resource— an RDF index document for the album, an RDF document for each audio track on the album. Example RDF index documents for the album and for audio tracks on the album are depicted below.

```
<rdf:Description
    xmlns:rdf="http://www.w3.org/1999/02/22-rdf-syntax-ns#"
    xmlns:jrs="http://jazz.net/xmlns/indexer/v0.6#"
    xmlns:ns="http://example.com/xmlns/music#"
    rdf:about="/jazz/resources/musicdb/albums/album-1">
    <dc:format>application/xml</dc:format>
    <rdf:type rdf:resource="http://example.com/xmlns/music#album"/>
    <ns:name> Keep the Faith </ns:name>
    <ns:artist rdf:resource="/jazz/resources/musicdb/artists/artist-1">
    <ns:genre>Rock</ns:genre>
</rdf:Description>
<rdf:Description
    xmlns:rdf="http://www.w3.org/1999/02/22-rdf-syntax-ns#"
    xmlns:jrs="http://jazz.net/xmlns/indexer/v0.6#"
    xmlns:ns="http://example.com/xmlns/music#"
    rdf:about="/jazz/resources/musicdb/albums/album-1#track-01">
    <rdf:type rdf:resource="http://example.com/xmlns/music#track"/>
    <ns:name>I believe </ns:name>
    <ns:trackNumber rdf:datatype="http://
        www.w3.org/2001/XMLSchema#integer">1
    </ns:trackNumber>
</rdf:Description>
```

In addition to indicating indexed resource properties, the index documents can also specify a location of the resource on the resource store. The flow continues at block 216.

Figure 3:
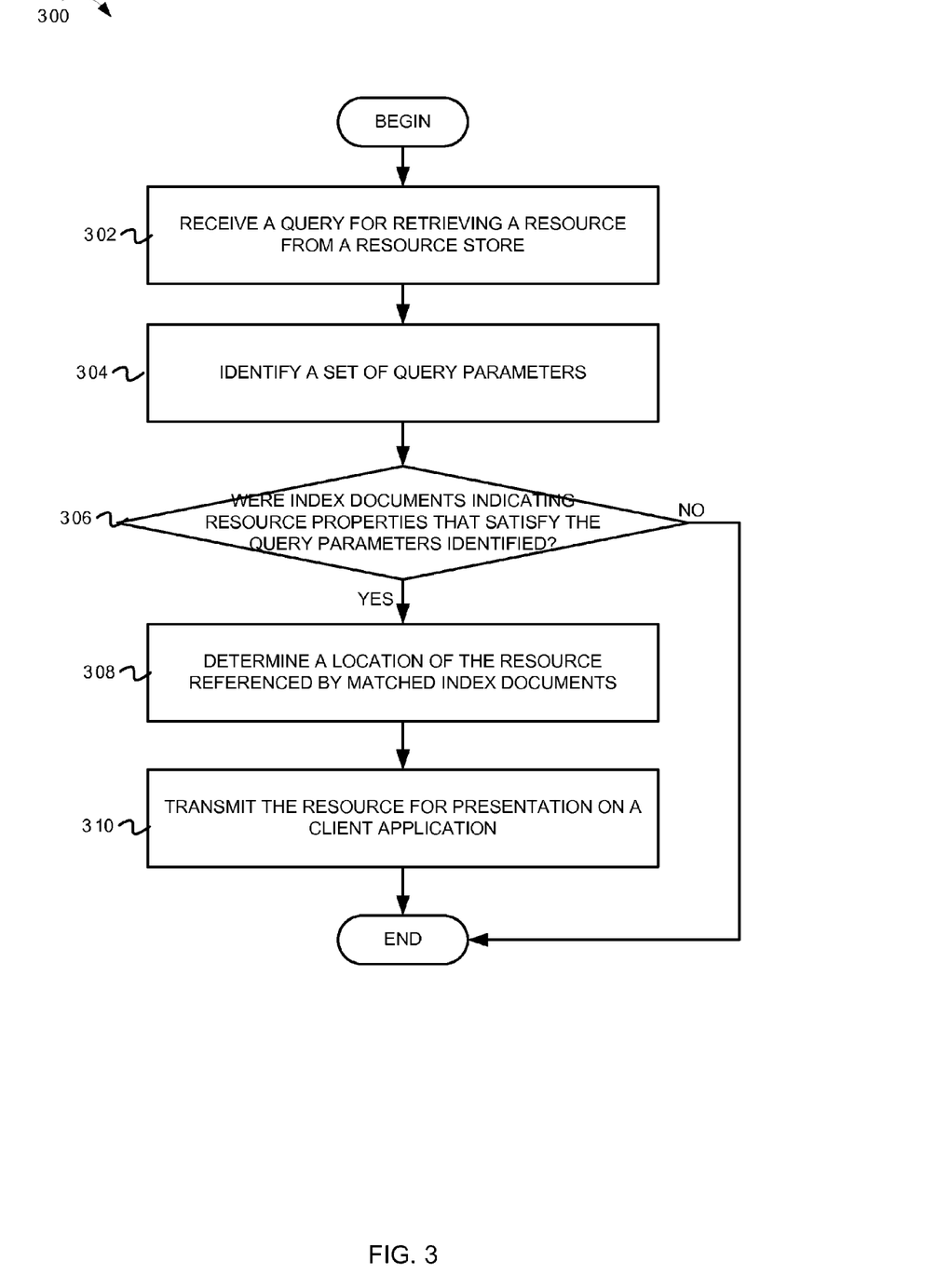
FIG. 3 is a flow diagram illustrating example operations for using index documents to access heterogeneous resources.

The index documents for the resource are stored in an index store (block 216). The index store may be an XML enabled data store such as data stores provided by IBM DB2®, Oracle® database server, or Microsoft SQL Server®. The XML enabled index store may allow clients to query resources against the index documents using XML based queries (written in XQuery). The XML enabled index store may also allow RDF aware processors to query resources against the index documents using RDF based queries (written in SPARQL). From block 218, the flow ends FIG. 3 is a flow diagram illustrating example operations for using index documents to access heterogeneous resources. Flow 300 begins at block 302.

A query for retrieving a resource from a resource store is received (block 302). The query may be received from a client application (e.g., a file search engine). A user may generate the query by specifying a set of query parameters on an interface presented by the client application. The query is directed to an index store comprising index documents for each resource on the resource store. The index documents indicate resource properties and reference the resource in the resource store. The query can be in any suitable query language based on the format of the index store. For example, the index store may be an RDF store and the query may be written in an RDF-based query language (e.g., SPARQL). The RDF based query language is suited to processing RDF index documents and can generate concise queries. The following code snippet illustrates an example query in SPARQL for retrieving resources modified on or after Feb. 1, 2008.

```
PREFIX jrs: <http://jazz.net/xmlns/indexer/v0.6#>
SELECT DISTINCT ?subject
WHERE { ?subject jrs:resource-last-modified ?date .
FILTER ( xsd:date(?date) >= xsd:date("2008-02-01") ) }
```

In another implementation, the index store may be an XML enable store that allows the queries to be written in an XML based query language (e.g., XQuery, XPath, etc). The following code snippet illustrates an example query in XQuery for retrieving audio resources belonging to a rock genre. The flow continues at block 304.

```
declare namespace rdf = "http://www.w3.org/1999/02/22-rdf-syntax-ns#";
declare namespace music = "http://example.com/xmlns/music#";
for $index in db2-fn:xmlcolumn('JRS_RDF_INDEX.RDF')/rdf:Description
where $index/rdf:type/@rdf:resource = "http://
example.com/xmlns/music#album"
and $index/music:genre = "Rock"
return $index/fn:string(@rdf:about
```

A set of query parameters are identified (block 304). The query parameters can specify properties of the resource to be retrieved. In some implementations, the query parameters may also specify a resource category to narrow the scope of the query. For example, the query parameters may indicate that resources belonging to a music category should be searched. As another example, the query parameters may indicate that only resources with a filename extension of ".txt" should be searched. The query parameters can also indicate user-specified values for search criteria. For example, the query parameters can indicate a genre, an artist name, album name, track name, track length, etc. for a music resource to be retrieved. As another example, the query parameters can indicate a name, a source, a resolution, a color space, a number of pixels, etc. for an image resource to be retrieved. In the above code snippet, the query parameter in the SPARQL query is "resource-last-modified>=2008-02-01". The flow continues at block 306.

It is determined whether index documents indicating resource properties satisfying the query parameters were identified (block 306). Indexed resource properties in the index documents can be searched to identify the index documents with resource properties that satisfy the query parameters ("matched index documents"). For the SPARQL query (described with reference to block 302), the index documents indicating a resource-last-modified date greater than Feb. 1, 2008 may be identified. The resource category, if specified as part of the query parameters, can help reduce the number of index documents that should be searched to locate the matched index documents. If it is determined that the index documents indicating the resource properties satisfying the query parameters were identified, the flow continues at block 308. Otherwise, the flow ends.

A location of the resource referenced by the matched index document is determined (block 308). For example, the matched index document can indicate a memory location from which the resource can be retrieved. As another example, the matched index document can indicate a server address from which the resource can be retrieved. The flow continues at block 310.

The resource is transmitted for presentation on the client application (block 310). In some implementations, the actual resource (e.g., an entire text document, a music file) may be transmitted for presentation on the client. In another implementation, a link to the location of the resource may be presented. The resource may be downloaded from the resource store and presented on the client after the user clicks on the link. From block 310, the flow ends.

It should be noted that the operations described in the flow diagrams (FIGS. 2-3) are examples meant to aid in understanding embodiments, and should not be used to limit embodiments or limit scope of the claims. Embodiments may perform additional operations, fewer operations, operations in a different order, operations in parallel, and some operations differently. For instance, although FIG. 2 describes identifying a single resource index schema for the resource, in some implementations, multiple resource index schemata may be identified for the resource. As an example, it may be determined (at block 204) that the resource is an XHTML file. Therefore, a resource index schema for XML files and a resource index schema for HTML files may be retrieved. Resource properties specified by both the XML and HTML resource index schema may be retrieved from the XHTML file and converted into index documents.

Also, in some implementations, the client application may keep track of resource properties specified by the user while uploading the resources. For example, the client application may record an indication that the user requested that genre, artist name, and album name be indexed for audio resources. In another implementation, the client application may interface with a server, retrieve a list of query parameters (e.g., indexed properties for resources in a resource category, previously searched properties of resources in the resource category, indexed/searched properties for all resource categories, etc.), and present search criteria. The user can indicate query parameters by indicating values for the search criteria.

Figure 4:
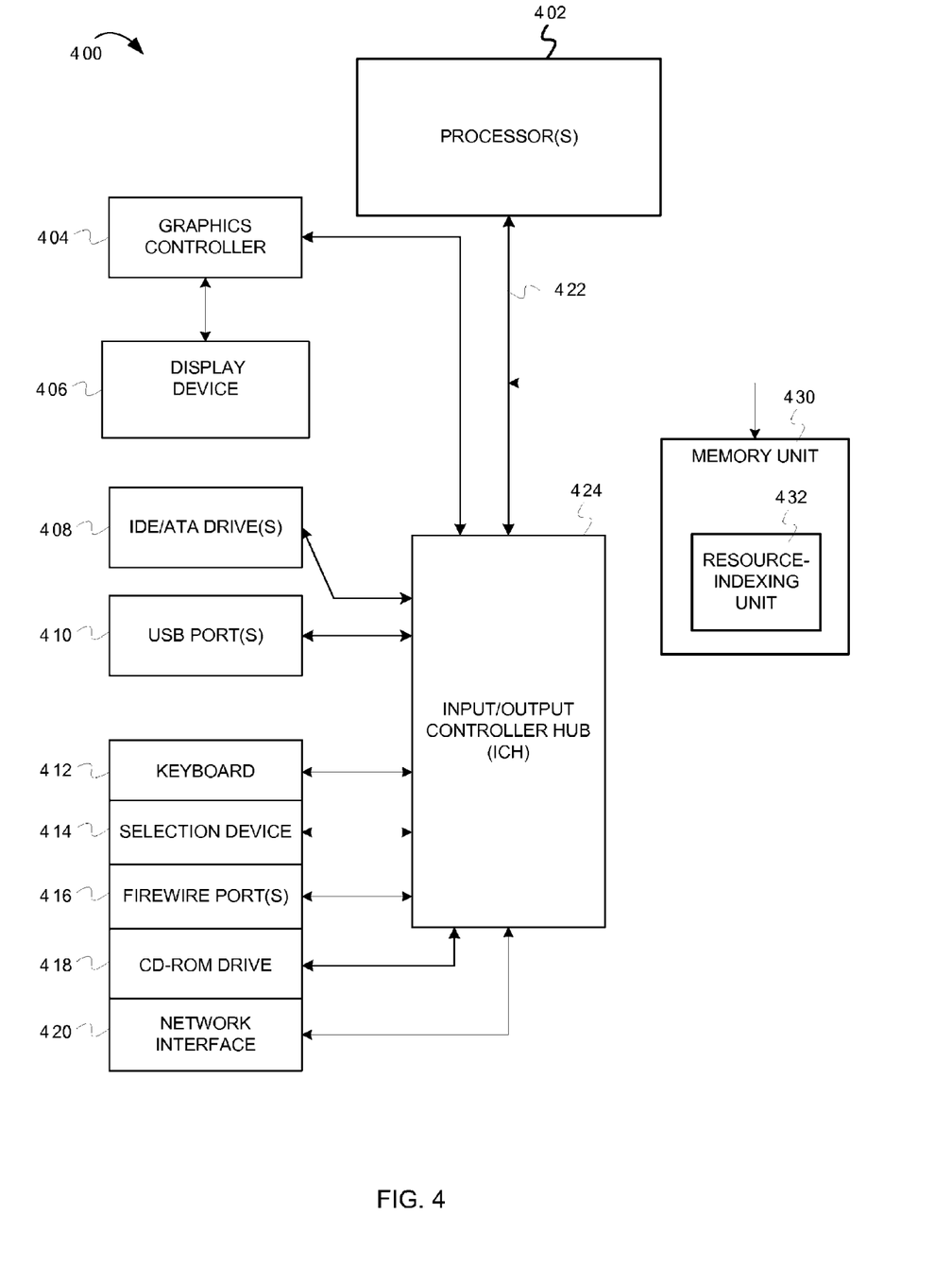
FIG. 4 is an example computer system 400 configured for creating index documents for heterogeneous resources and retrieving a resource based on the index documents.

FIG. 4 is an example computer system 400 configured for creating index documents for heterogeneous resources and retrieving a resource based on the index documents. The computer system 400 includes a processor 402. The processor 402 is connected to an input/output controller hub 424 (ICH), also known as a south bridge, via a bus 422 (e.g., PCI, ISA, PCI-Express, HyperTransport, etc). A memory unit 430 interfaces with the processor 402 and the ICH 424. The main memory unit 430 can include any suitable random access memory (RAM), such as static RAM, dynamic RAM, synchronous dynamic RAM, extended data output RAM, etc The memory unit 430 comprises a resource-indexing unit 432. The resource-indexing unit 432 constructs index documents such that a common query format can be used to access resources from a plurality of resources in heterogeneous resource formats as described in accordance with FIGS. 1-3. The resource-indexing unit 432 identifies one or more resource index schemata, which identify a set of resource properties that should be indexed. Once the set of resource properties are identified, the resource-indexing unit 432 generates index documents that indicate the identified set of resource properties. The index documents are in a uniform format independent of the resource format. For example, an index document for an audio resource and an index document for an image resource may be in the same format (e.g., an RDF format). On receiving a query to access the resource, the resource-indexing unit 432 can compare query parameters with resource properties indicated by the index documents, identify index documents indicating resource properties that match all the query parameters, and accordingly retrieve resources referenced by the identified index documents.

The ICH 424 connects and controls peripheral devices. In FIG. 4, the ICH 424 is connected to IDE/ATA drives 408 and to universal serial bus (USB) ports 410. The ICH 424 may also be connected to a keyboard 412, a selection device 414, firewire ports 416, CD-ROM drive 418, and a network interface 420. The ICH 424 can also be connected to a graphics controller 404. The graphics controller is connected to a display device 406 (e.g., monitor). In some embodiments, the computer system 400 can include additional devices and/or more than one of each component shown in FIG. 4 (e.g., video cards, audio cards, peripheral devices, etc.). For example, in some instances, the computer system 400 may include multiple processors, multiple cores, multiple external CPU's. In other instances, components may be integrated or subdivided.

Figure 5:
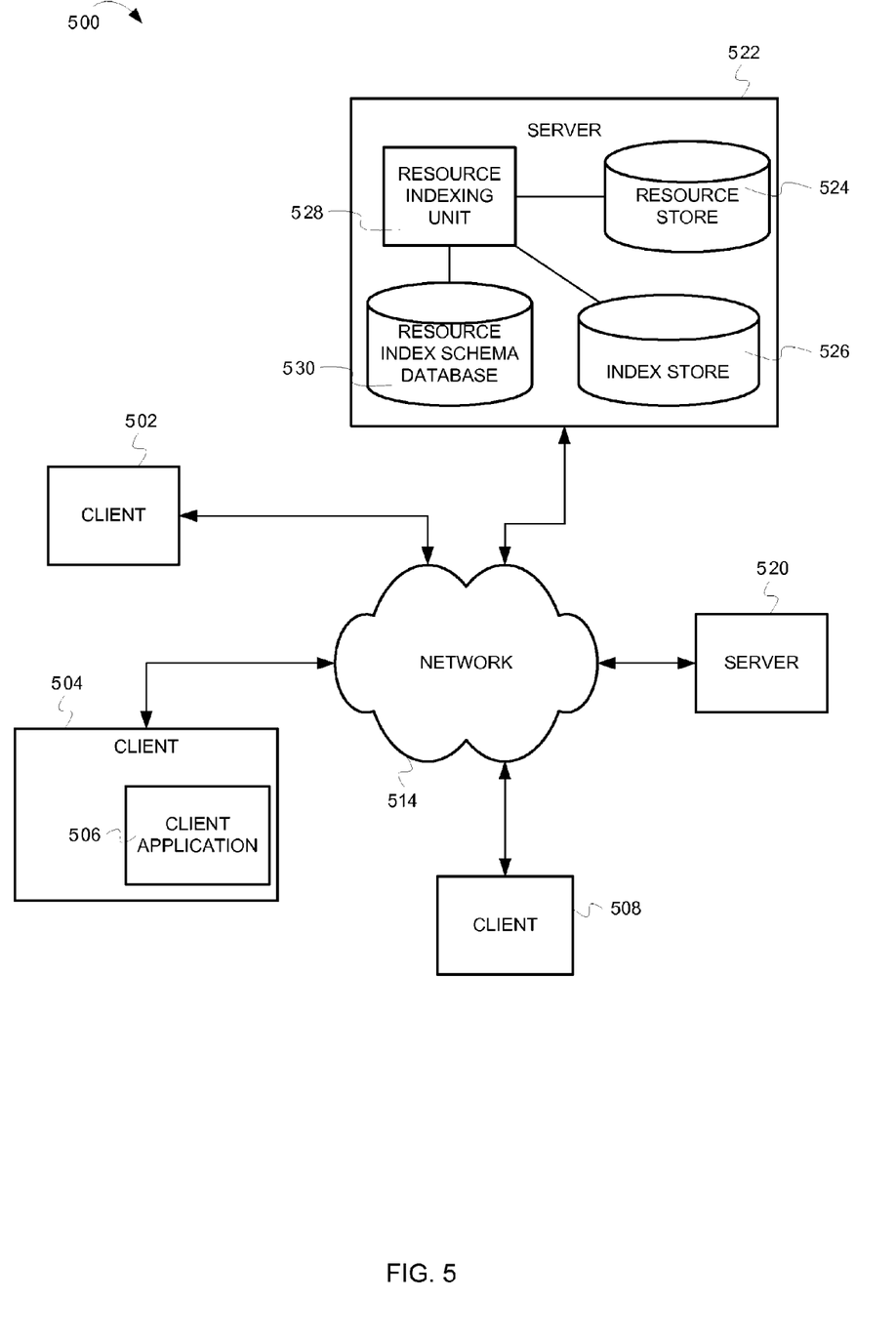
FIG. 5 is an example block diagram configured for indexing and querying heterogeneous resources.

FIG. 5 is an example block diagram configured for indexing and querying heterogeneous resources. The system 500 comprises servers 522 and 520 and clients 502, 504, and 508. The server 522 comprises a resource-indexing unit 528, a resource store 524, a resource index schema database 530, and an index store 526. The resource-indexing unit 528 is coupled with the resource store 524, the resource index schema database 530, and the index store 526. The client (e.g., the client 504) comprises a client application 506, which enables the user to upload resources to the resource store 524 and presents resources retrieved from the resource store 524.

The resource-indexing unit 528 constructs index documents for resources in the resource store 524. The resource-indexing unit 528 constructs the index documents based on a resource index schema (in the resource index schema database 530). The resource index schema indicates a set of resource properties that should be indexed. The index documents are stored in the index store 526. The resource indexing unit 528 accepts queries written in a standard query format (e.g., XML based XQuery, RDF based SPARQL, etc) and compares query parameters with resource properties indicated by the index documents in the index store 526. The resource indexing-unit 528 identifies index documents indicating resource properties that match all the query parameters and accordingly retrieves resources referenced by the identified index documents. For example, the resource store 524 may hold documents, images, structured XML files, files in legacy or proprietary formats, etc. The resources in the resource store 524 have properties and relationships that clients 502, 504, and 508 can use to write queries to retrieve the resources. Because the index documents are in a standard format (e.g., an RDF format) and are not in heterogeneous formats, the query can be generated (e.g., by the client application 506 based on user inputs) independent of the format of the resource being queried.

The servers 520 and 522 and the clients 502, 504, and 508 communicate via a communication network 514. The communication network 514 can include any technology (e.g., Ethernet, IEEE 802.11n, SONET, etc) suitable for passing communication between the servers 520 and 522 and the clients 502, 504, and 508. Moreover, the communication network 514 can be part of other networks, such as cellular telephone networks, public-switched telephone networks (PSTN), cable television networks, etc. Additionally, the servers 520 and 522 and the clients 502, 504, and 508 can be any suitable devices capable of executing software in accordance with the embodiments described herein. In some implementations, the resources may be stored on the server 520, separate from the resource-indexing unit 528, the resource index schema database 530, and the index documents database 526. In some implementations, the resource-indexing unit 528 on the server 522 may be implemented as a chip, plug-in, code in memory, etc.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

While the embodiments are described with reference to various implementations and exploitations, it will be understood that these embodiments are illustrative and that the scope of the inventive subject matter is not limited to them. In general, techniques for indexing heterogeneous resources as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   receiving a notification indicating that a resource is stored in a resource store;
   determining a resource category for the resource based, at least in part, on metadata of the resource, in response to said receiving the notification indicating that the resource is stored in the resource store;
   determining whether a resource index schema for the resource can be identified based on the resource category for the resource;
   in response to determining that the resource index schema for the resource category can be identified,
      identifying the resource index schema for the resource, wherein the resource index schema indicates a resource property of the resource;
      determining, from the metadata of the resource, a property value for the resource property indicated in the resource index schema for the resource category;
      creating a first index document that has a format independent of a format of the resource, that indicates the resource property and the property value, and that references the resource in the resource store of heterogeneous native format resources;
   in response to determining that the resource index schema for the resource cannot be identified,
      identifying a generic schema that indicates at least one property related to storing the resource in a resource store;
      identifying a property value of the resource for the at least one property indicated in the generic schema;
      creating a second index document that has a format independent of a format of the resource, that indicates the at least one property identified in the generic schema and the corresponding property value, and that references the resource in the resource store of heterogeneous native format resources; and
   storing the first index document or the second index document in an index store that comprises a plurality of index documents, wherein the first index document, the second index document, and the plurality of index documents have common formatting.

2. The method of claim 1 wherein the index document comprises a resource description framework based index document and indicates a location of the resource in the resource store.

3. The method of claim 1, wherein the at least one property related to storing the resource in the resource store comprise at least one of a date on which the resource was stored, information identifying a user who stored the resource, device identifiers of an electronic device used for storing the resource, and an Internet address of a website used to upload the resource to the resource store.

4. A method comprising:
    determining a query parameter specifying a property value of a resource property of a resource based, at least in part, on a received query, wherein the query is generated to retrieve the resource from a resource store of heterogeneous native format resources;
    searching through an index store that comprises a plurality of index documents to identify an index document that indicates the resource property and the corresponding property value specified in the query parameter, wherein the plurality of index documents have common formatting;
    determining whether the index store comprises the index document that indicates the resource property and the corresponding property value specified in the query parameter;
    in response to determining that the index store comprises the index document that indicates the resource property and the corresponding property value specified in the query parameter,
        identifying the index document that indicates the resource property and the property value specified in the query parameter and that references the resource in the resource store; and
        retrieving the resource from the resource store based on said identifying the index document that indicates the resource property and the property value specified in the query parameter and that references the resource in the resource store;
    in response to determining that the index store does not comprise the index document that indicates the resource property and the corresponding property value specified in the query parameter;
        determining an inability to identify the index document that references the resource in the resource store; and
        presenting a notification indicating the inability to identify the resource in the resource store that is associated with the resource property and the corresponding property value specified in the query parameter.

5. The method of claim 4, further comprising identifying a location of the resource based on said identifying the index document.

6. The method of claim 4, further comprising one of presenting the resource, transmitting the resource for presentation on a client, and presenting a link to a location of the resource.

7. A computer program product for indexing heterogeneous resources, the computer program product comprising:
    a non-transitory computer usable storage medium having computer usable program code embodied therewith, the computer usable program code configured to:
    receive a notification indicating that a resource is stored in a resource store;
    determine a resource category for the resource based, at least in part, on metadata of the resource, in response to the computer usable program code receiving the notification indicating that the resource is stored in the resource store;
    determine whether a resource index schema for the resource can be identified based on the resource category for the resource;
    in response to determining that the resource index schema for the resource category can be identified,
        identify the resource index schema for the resource, wherein the resource index schema indicates a resource property of the resource;
        determine, from the metadata of the resource, a property value for the resource property indicated in the resource index schema for the resource;
        create a first index document that has a format independent of a format of the resource, that indicates the resource property and the property value, and that references the resource in the resource store of heterogeneous native format resources;
    in response to determining that the resource index schema for the resource cannot be identified,
        identify a generic schema that indicates at least one property related to storing the resource in a resource store;
        identify a property value of the resource for the at least one property indicated in the generic schema;
        create a second index document that has a format independent of a format of the resource, that indicates the at least one property identified in the generic schema and the corresponding property value, and that references the resource in the resource store of heterogeneous native format resources; and
    store the first index document or the second index document in an index store that comprises a plurality of index documents, wherein the first index document, the second index document, and the plurality of index documents have common formatting.

8. The computer program product of claim 7, wherein the index document comprises a resource description framework based index document and indicates a location of the resource in the resource store.

9. The computer program product of claim 7, wherein the at least one property related to storing the resource in the resource store comprise at least one of a date on which the resource was stored, information identifying a user who stored the resource, device identifiers of an electronic device used for storing the resource, and an Internet address of a website used to upload the resource to the resource store.

10. The computer program product of claim 7, wherein the computer usable program code is further configured to:
    determine a query parameter specifying the property value of the resource property of the resource based, at least in part, on a received query, wherein the query is generated to retrieve the resource from the resource store;
    search through the index store that comprises the plurality of index documents to identify the index document that indicates the resource property and the corresponding property value specified in the query parameter;
    determine whether the index store comprises the index document that indicates the resource property and the corresponding property value specified in the query parameter;
    in response to determining that the index store comprises the index document that indicates the resource property and the corresponding property value specified in the query parameter,
        identify the index document that indicates the resource property and the property value specified in the query parameter and that references the resource in the resource store; and
        retrieve the resource from the resource store based on the computer usable program code identifying the index document that indicates the resource property and the property value specified in the query parameter and that references the resource in the resource store.

11. The computer program product of claim 10, further comprising one of the computer usable program code configured to present the resource, the computer usable program code configured to transmit the resource for presentation on a client, and the computer usable program code configured to present a link to a location of the resource.

12. The computer program product of claim 10, wherein the computer usable program code is further configured to:
in response to determining that the index store does not comprise the index document that indicates the resource property and the corresponding property value specified in the query parameter,
determine an inability to identify the index document that references the resource in the resource store; and
present a notification indicating the inability to identify the resource in the resource store that is associated with the resource property and the corresponding property value specified in the query parameter.

13. An apparatus comprising:
a processor;
a network interface coupled with the processor, the network interface operable to receive a notification indicating that a resource is stored in a resource store;
the resource store for storing heterogeneous native format resources;
an index store comprising a plurality of index documents with common formatting; and
a resource-indexing unit operable to
determine a resource category for the resource based, at least in part, on metadata of the resource, in response to the network interface receiving the notification indicating that the resource is stored in the resource store;
determine whether a resource index schema for the resource can be identified based on the resource category for the resource;
in response to the resource-indexing unit determining that the resource index schema for the resource category can be identified,
identify the resource index schema for the resource, wherein the resource index schema indicates a resource property of the resource;
determine, from the metadata of the resource, a property value for the resource property indicated in the resource index schema for the resource;
create a first index document that has a format independent of a format of the resource, that indicates the resource property and the property value, and that references the resource in the resource store of heterogeneous native format resources;
in response to the resource-indexing unit determining that the resource index schema for the resource cannot be identified,
identify a generic schema that indicates at least one property related to storing the resource in a resource store;
identify a property value of the resource for the at least one property indicated in the generic schema;
create a second index document that has a format independent of a format of the resource, that indicates the at least one property identified in generic schema and the corresponding property value, and that references the resource in the resource store of heterogeneous native format resources; and
store the first index document and the second index document in an index store that comprises the plurality of index documents, wherein the first index document, the second index document, and the plurality of index documents have common formatting.

14. The apparatus of claim 13, wherein the resource-indexing unit is further operable to:
determine a query parameter specifying the property value of the resource property of the resource based, at least in part, on a received query, wherein the query is generated to retrieve the resource from the resource store;
search through the index store that comprises the plurality of index documents to identify the index document that indicates the resource property and the corresponding property value specified in the query parameter;
determine whether the index store comprises the index document that indicates the resource property and the corresponding property value specified in the query parameter;
in response to the resource-indexing unit determining that the index store comprises the index document that indicates the resource property and the corresponding property value specified in the query parameter,
identify the index document that indicates the resource property and the property value specified in the query parameter and that references the resource in the resource store; and
retrieve the resource from the resource store based on the resource-indexing unit identifying the index document that indicates the resource property and the property value specified in the query parameter and that references the resource in the resource store;
in response to the resource-indexing unit determining that the index store does not comprise the index document that indicates the resource property and the corresponding property value specified in the query parameter;
determine an inability to identify the index document that references the resource in the resource store; and
present a notification indicating the inability to identify the resource in the resource store that is associated with the resource property and the corresponding property value specified in the query parameter.

15. The apparatus of claim 13, wherein the resource-indexing unit comprises machine-readable media.

16. The method of claim 1, comprising:
in response to determining that the resource index schema for the resource category can be identified,
determining whether the metadata of the resource comprises the property value for the resource property indicated in the resource index schema for the resource category;
in response to determining that the metadata of the resource comprises the property value for the resource property indicated in the resource index schema for the resource category,
said determining, from the metadata of the resource, the property value for the resource property indicated in the resource index schema for the resource category;
in response to determining that the metadata of the resource does not comprise the property value for the resource property indicated in the resource index schema for the resource category,
said identifying the generic schema that indicates the at least one property related to storing the resource in the resource store and identifying the property value of the resource for the at least one property indicated in the generic schema.

17. The method of claim 1, further comprising:

in response to determining that the resource index schema for the resource category can be identified, identifying a second resource index schema for the resource category, wherein the second resource index schema indicates a second resource property of the resource;

determining, from the metadata of the resource, a second property value corresponds to the second resource property indicated in the second resource index schema for the resource category;

creating a third index document that has a format independent of a format of the resource, that indicates the second resource property and the corresponding second property value, and that references the resource in the resource store; and storing the third index document in the index store.

18. The method of claim 4, wherein said determining the query parameter specifying the property value of the resource property of the resource comprises:

receiving an indication of a resource category associated with the resource to be accessed;

presenting a plurality of resource properties associated with the resource category, wherein the plurality of resource properties are determined based on at least one of previously indexed resource properties of one or more resources that belong to the resource category and previously searched resource properties associated with one or more resources that belong to the resource category; and detecting a selection of the resource property of the plurality of resource properties prior to said determining the query parameter specifying the property value of the resource property of the resource.

* * * * *